United States Patent
Lo et al.

(10) Patent No.: US 10,037,481 B2
(45) Date of Patent: Jul. 31, 2018

(54) SYSTEM AND METHOD FOR AN OTITIS MEDIA DATABASE CONSTRUCTING AND AN IMAGE ANALYZING

(71) Applicant: National Central University, Taoyuan (TW)

(72) Inventors: Men-Tzung Lo, Taoyuan (TW); Te-Yung Fang, Taipei (TW); Van-Truong Pham, Hai Phong (VN); Thi-Thao Tran, Vinh Phuc Province (VN); Pa-Chun Wang, Taipei (TW)

(73) Assignee: National Central University, Taoyuan (TW)

( * ) Notice: Subject to any disclaimer, the term of this patent is extended or adjusted under 35 U.S.C. 154(b) by 74 days.

(21) Appl. No.: 15/210,121

(22) Filed: Jul. 14, 2016

(65) Prior Publication Data
US 2017/0323176 A1 Nov. 9, 2017

(30) Foreign Application Priority Data
May 5, 2016 (TW) .............................. 105113958 A

(51) Int. Cl.
G06K 9/62 (2006.01)
G06F 17/30 (2006.01)
G06K 9/46 (2006.01)
G06T 7/00 (2017.01)

(52) U.S. Cl.
CPC ......... *G06K 9/628* (2013.01); *G06F 17/3025* (2013.01); *G06F 17/3028* (2013.01); *G06F 17/30256* (2013.01); *G06F 17/30262* (2013.01); *G06F 17/30265* (2013.01); *G06K 9/4633* (2013.01); *G06T 7/0012* (2013.01); *G06T 2207/10004* (2013.01); *G06T 2207/30004* (2013.01)

(58) Field of Classification Search
None
See application file for complete search history.

(56) References Cited

U.S. PATENT DOCUMENTS

| 2004/0218788 A1* | 11/2004 | Geng ................ G06K 9/00885 382/118 |
| 2011/0164826 A1* | 7/2011 | Noguchi ........... G06F 17/30247 382/253 |

* cited by examiner

*Primary Examiner* — Matthew Bella
*Assistant Examiner* — Brian Shin
(74) *Attorney, Agent, or Firm* — Muncy, Geissler, Olds & Lowe, P.C.

(57) ABSTRACT

The invention provides a system and a method for an otitis media database constructing. The steps of method comprise: First, receiving a plurality of tympanic membrane images, wherein the tympanic membrane images are ear infection in different types. Second, choosing one of the tympanic membrane images, then classifying into a plurality of anatomic regions based on a plurality of tissue types. Coding each of anatomic regions with a numerical number to describe its morbid condition, and obtaining an eigenvalue through collecting the numerical number of each anatomic region. Furthermore, repeatedly choosing other one of tympanic membrane images until each tympanic membrane image obtaining the eigenvalue. And obtaining a matrix through collecting the eigenvalue of each tympanic membrane image, then generating an otitis media database.

10 Claims, 7 Drawing Sheets

Image No:_____

200

| 0 | Normal |
| 1 | Normal, atrophic scar |
| 2 | Normal, post-ventilation tube |
| 3 | AOM, hyperemic stage |
| 4 | AOM, suppurative stage |
| 5 | AOM, ear drum perforation |
| 6 | AOM, subacute/resolution stage |
| 7 | AOM, bullous myringitis |
| 8 | AOM, barotrauma |
| 9 | OME, with effusion |
| 10 | OME, resolution stage (retracted) |
| 11 | COM, simple perforation |
| 12 | COM, active infection |
| 13 | COM, retraction pocket |
| 14 | COM, cholesteatoma |
| 15 | COM, granulation |
| 16 | COM, post-operative status |
| 17 | OM, with ventilation tube |
| 18 | OM, myringitis |
| 19 | Traumatic Perforation |
| 20 | Acute otitis externa |
| 21 | Hard to determined |

FIG. 2A

| | | | | | | | |
|---|---|---|---|---|---|---|---|
| A. Color: | | ①amber | ①red-pink | ①red-markedly red | ④white | ⑤gray | ⑥blue | ⑦black |
| B. The 1st Color Distributions: | | ①mildly(<30%) | ②moderate(30-60%) | ③near total(>60%) | | | | |
| C. The 2nd Color Distributions: | | ①mildly(<30%) | ②moderate(30-60%) | ③near total(>60%) | | | | |
| D. The 3rd Color Distributions: | | ①mildly(<30%) | ②moderate(30-60%) | ③near total(>60%) | | | | |
| E. Light Reflex: | ⓪no | ①yes | | | | | | |
| F. Small Vessel: | ⓪no | ①mild injected | ②severe injected | | | | | |
| G. Transparency: | ⓪no | ①partial(pered to be clear) | ②partial(pered to be no clear) | ③yes | | | | |
| H. Bubble presence: | ⓪no | ①yes | | | | | | |
| I. Malleus presence: | ⓪no | ①yes | | | | | | |
| J. Hole: | ⓪no pin-point | ①circular | ②non-circular | | | | | |
| K. Discharge: | ⓪no | ①yes | | | | | | |
| L. Bulging & Atelectasis: | ⓪no | ①mild Bulging | ②severe Bulging | ③mild Atelectasis | ④severe Atelectasis | | | |
| M. Attic Retraction: | ⓪no | ①mild | ②moderate | | | | | |
| N. Cholesteatoma: | ⓪no | ①yes | | | | | | |
| O. Granulation: | ⓪no | ①yes | | | | | | |
| P. Ear Wax Distribution: | ⓪no | ①moderate | ②near total | | | | | |
| Q. Myringitis: | ⓪no | ①yes white color | ②yes black color | | | | | |
| R. Ear Canal Color: | ⓪no | ①red-pink | ②red-markedly red | ③white | ④gray | | | |
| S. Ear Canal Small Vessel: | ⓪no | ①mild injected | ②severe injected | | | | | |

SYSTEM AND METHOD FOR AN OTITIS MEDIA DATABASE CONSTRUCTING AND AN IMAGE ANALYZING

CROSS-REFERENCE TO RELATED APPLICATIONS

This Non-provisional application claims priority under 35 U.S.C. § 119(a) on Patent Application No(s). [105113958] filed in Taiwan, Republic of China [May 5, 2016], the entire contents of which are hereby incorporated by reference.

FIELD OF THE INVENTION

The invention provides a system and a method for database constructing and more particularly, to a system and method for an otitis media database constructing.

BACKGROUND OF THE INVENTION

Otitis media is a group of inflammatory diseases of the middle ear, wherein acute otitis media (AOM) and otitis media with effusion (OME) are two main types of otitis media. It may be associated with hearing loss. In the present study, the long duration of hearing loss resulting from otitis media may affect a child's learning ability. Clinically, pneumatic otoscopy or endoscopy remain the standard examinations for patients with suspected otitis media. The diagnosis of otitis media requires checking local findings of tympanic membranes, and also evaluates the symptoms/signs of the patients by physicians.

For an example, AOM is an infection of rapid onset that usually presents with ear pain. In young children, fever, pulling the ear, crying frequently, poor appetite and poor sleep are common symptoms.

For another example, OME is typically not associated with symptoms. It is defined as the presence of non-infectious fluid in the middle ear for more than three months.

For another example, chronic suppurative otitis media (CSOM) is a long standing infection and sometimes with persistent drainage from middle ear. It also may be a complication of acute otitis media.

Therefore, the diagnosis of ear infection mostly depends on experienced physicians. It is very easy to have a misdiagnosis initially. The invention provides a database through quantifying pathological features of otitis media from the capturing tympanic membrane images. It may help the physicians reducing the risk of misdiagnosis by comparing the patient images with the database.

SUMMARY OF THE INVENTION

The invention provides a method for an otitis media database constructing. The steps of method comprise: First, receiving a plurality of tympanic membrane images, wherein the tympanic membrane images are ear infection in different types. Second, choosing one of the tympanic membrane images, and classifying into a plurality of anatomic regions based on a plurality of tissue types. Based on a morbid condition of the anatomic region, identifying a numerical number to each anatomic region and obtaining an eigenvalue through collecting the numerical number of each anatomic region. Furthermore, repeatedly choosing other one of tympanic membrane images until each tympanic membrane image obtaining the eigenvalue. Obtaining a matrix through collecting the eigenvalue of each tympanic membrane image, then generating an otitis media database.

In an embodiment, above method is implemented by a system which comprises a receiving device, a computation processor and an access device.

The receiving device retrieves a plurality of tympanic membrane images, wherein the tympanic membrane images are ear infection in different types.

The computation processor is connected with the receiving device to choose one of the tympanic membrane images, and classifies the tympanic membrane image into a plurality of anatomic regions based on a plurality of tissue types. Then, each of anatomic regions is coded with a numerical number to describe its morbid condition.

Furthermore, the computation processor chooses other one of anatomic regions orderly until all anatomic regions are coded with numerical numbers, and obtains an eigenvalue through collecting the numerical number of each anatomic region. The computation processor further chooses other one of tympanic membrane images repeatedly until each tympanic membrane image obtaining the eigenvalue.

The access device is connected with the computation processor to obtain a matrix through collecting the eigenvalue of each tympanic membrane image, and then generates an otitis media database.

The invention also provides a method for an image analysis. The steps of method comprise: First, receiving a tympanic membrane image, and classifying the tympanic membrane image into a plurality of anatomy regions based on a plurality of tissue types. Coding each of anatomic regions with a numerical number to describe its morbid condition. Then, obtaining an eigenvalue through collecting the numerical number of each anatomic region.

Furthermore, obtaining a matrix based on an otitis media database, then obtaining a plurality of contrast values based on performing multiplication of the matrix and a weighting matrix. Selecting a lowest difference value from the difference between the numerical numbers and the contrast values, then recording a type of ear infection based on the tympanic membrane image corresponding to the lowest difference value.

In an embodiment, above method is implemented by an image analysis system which comprises an otitis media database, a receiving device, a computation processor and an output device.

Wherein the otitis media database comprises at least one matrix.

The receiving device receives tympanic membrane image.

The computation processor is connected with the receiving device to classify the tympanic membrane image into a plurality of anatomy regions based on a plurality of tissue types. Then, each of anatomic regions is coded with a numerical number to describe its morbid condition.

Furthermore, the computation processor chooses other one of anatomic regions orderly until all anatomic regions are coded with the numerical numbers, then obtains an eigenvalue through collecting the numerical number of each anatomic region.

The output device is connected with the computation processor and the otitis media database, obtains a matrix from the otitis media database, and then obtains a plurality of contrast values based on performing multiplication of the matrix and a weighting matrix. The output device further selects a lowest difference value from the difference between the numerical numbers and the contrast values and records a type of ear infection based on the tympanic membrane image corresponding to the lowest difference value of the contrast value.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A and 2B illustrate diagram of the eigenvalue classification in accordance with various embodiments of the present disclosure.

DETAILED DESCRIPTION OF THE INVENTION

For clarity of disclosure, and not by way of limitation, the detailed description of the invention is divided into the subsections that follow. The present invention provides merely an example of the different types of functional arrangements that may be employed to implement the operation in the various components of a system, such as a computer system connected to an otoscope, a video-otoscope, a wireless video otoscope, and so forth.

The execution steps of the present invention may include application specific software which may store in any portion or component of the memory including, such as random access memory (RAM), read-only memory (ROM), hard drive, solid-state drive, magneto optical (MO), IC chip, USB flash drive, memory card, optical disc such as compact disc (CD) or digital versatile disc (DVD), floppy disk, ZIP, magnetic tape, or other memory components.

Generally speaking, the method of invention implemented in the computing device may comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance, or other devices with Input/output interfaces, and so forth.

Figure 1:
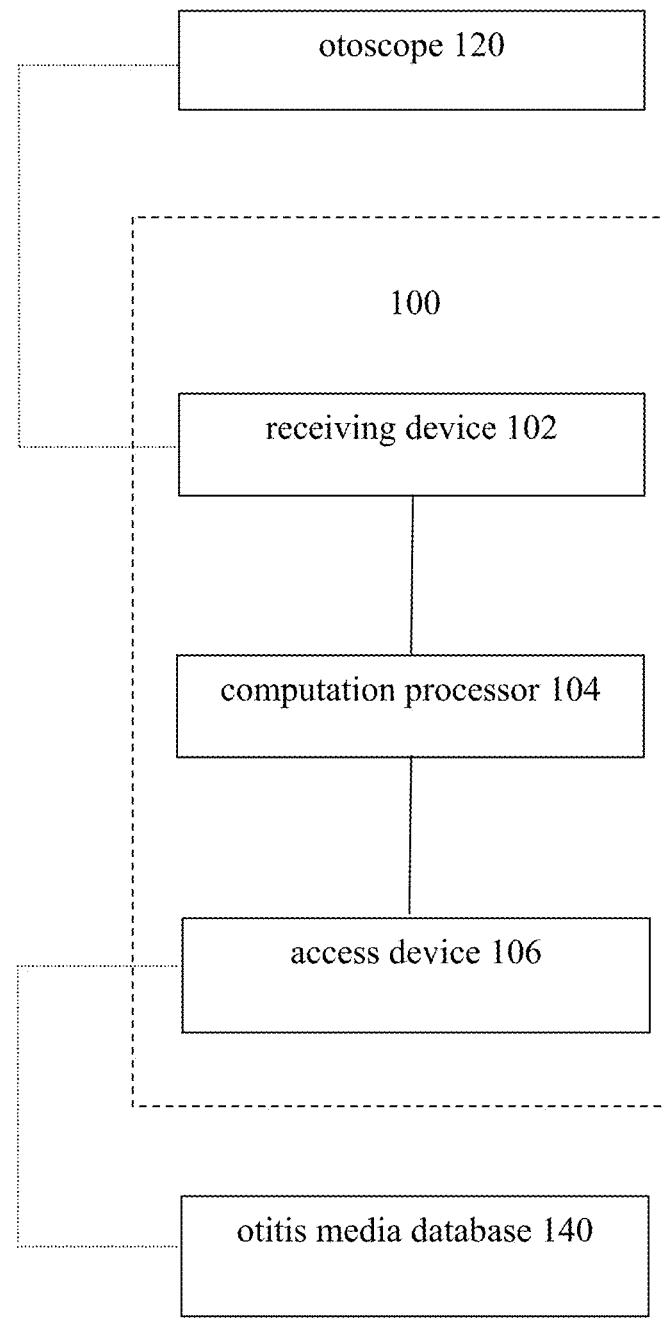
FIG. 1 is a block diagram of a system for database constructing in accordance with various embodiments of the present disclosure.

FIG. 1 is a block diagram of a system for database constructing in accordance with various embodiments of the present disclosure. The system for database constructing 100 comprises a receiving device 102, a computation processor 104 and an access device 106.

The receiving device 102 is coupled via a wired or wireless communication path to an otoscope 120 with an image capture device for retrieving a plurality of tympanic membrane images, wherein the tympanic membrane images are ear infection in different types. The ear infection may include, for example, an acute otitis media and an otitis media with effusion.

The computation processor 104 is connected with the receiving device 102 to choose one of the tympanic membrane images, and classifies the tympanic membrane image into a plurality of anatomic regions based on a plurality of tissue types. The tympanic membrane has an ectoderm and an endoderm aspect. For example, the computation processor 104 classifies the tympanic membrane image into a first anatomic region and a second anatomic region, wherein the first anatomic region is the endoderm and the second anatomic region is the ectoderm.

In an embodiment, the computation processor 104 can include any custom-made or commercially available processor, a central processing unit (CPU), a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

Each of anatomic regions is coded with a numerical number ($v_{11}$) to describe its morbid condition. The morbid condition of the anatomic region comprises at least one of color feature, geometric feature, texture feature and shape feature. The color feature comprises at least one of hue, saturation and lightness. The geometric feature comprises a histogram of oriented gradient (HOG). The texture feature comprises a local binary pattern (LBP). The shape feature comprises a statistical chart of self-similarity geometric pattern.

Furthermore, the computation processor 104 chooses other one of anatomic regions orderly until all anatomic regions are coded with numerical numbers ($v_{11}, \ldots, v_{1k}$), then obtains an eigenvalue ($A_1=[v_{11}, \ldots, v_{1k}]$) through collecting the numerical number of each anatomic region.

The computation processor 104 further chooses other one of tympanic membrane images repeatedly until each tympanic membrane image obtaining the eigenvalue ($A_2=[v_{21}, \ldots, v_{2k}], \ldots, A_n$).

FIGS. 2A and 2B illustrate diagram of the eigenvalue classification in accordance with various embodiments of the present disclosure. FIGS. 2A and 2B show otitis media classification 200 and the definition of the numerical number of each anatomic region 220.

In an embodiment, the anatomic region A is in the tympanic membrane image of acute otitis media, wherein the morbid condition of the anatomic region A is red-pink and the anatomic region A is represented by 2.

The anatomic region B is in the tympanic membrane image of acute otitis media, wherein the morbid condition of the anatomic region B is mild and the anatomic region B is represented by 1.

The anatomic region C is in the tympanic membrane image of acute otitis media, wherein the morbid condition of the anatomic region C is near total and the anatomic region C is represented by 3.

The computation processor 104 identifies a numerical number to each anatomic region until each anatomic region obtaining the numerical number, then obtains an eigenvalue [2 1 3 . . . ] through collecting the numerical number of each anatomic region.

In an embodiment, the anatomic region A is in the tympanic membrane image of otitis media with effusion, wherein the morbid condition of the anatomic region A is amber and the anatomic region A is represented by 1.

The anatomic region B is in the tympanic membrane image of otitis media with effusion, wherein the morbid condition of the anatomic region B is moderate and the anatomic region B is represented by 2.

The anatomic region C is in the tympanic membrane image of otitis media with effusion, wherein the morbid condition of the anatomic region C is mild and the anatomic region C is represented by 1.

The computation processor 104 identifies a numerical number to each anatomic region until each anatomic region obtaining the numerical number, then obtains an eigenvalue [1 2 1 . . . ] through collecting the numerical number of each anatomic region. The computation processor 104 obtains a matrix [2 1 3 . . . ; 1 2 1 . . . ; . . . ] through collecting the eigenvalue of each tympanic membrane image.

The access device 160 is connected with the computation processor 104 to obtain a matrix (A=[$v_{11}$, . . . , $v_{1k}$ $v_{21}$, . . . , $v_{2k}$, . . . , $v_{n1}$, . . . , $v_{nk}$]) through collecting the eigenvalue of each tympanic membrane image, then generates an otitis media database 140, wherein n represents the number of tympanic membrane images, and k represents the number of features regions.

In an embodiment, the access device 106 can include any one of a combination of volatile memory elements (e.g., random-access memory (RAM, such as DRAM, and SRAM, etc.)), nonvolatile memory elements (e.g., ROM, hard drive, tape, CDROM, etc.) and other common digital signals storage element.

Figure 3:
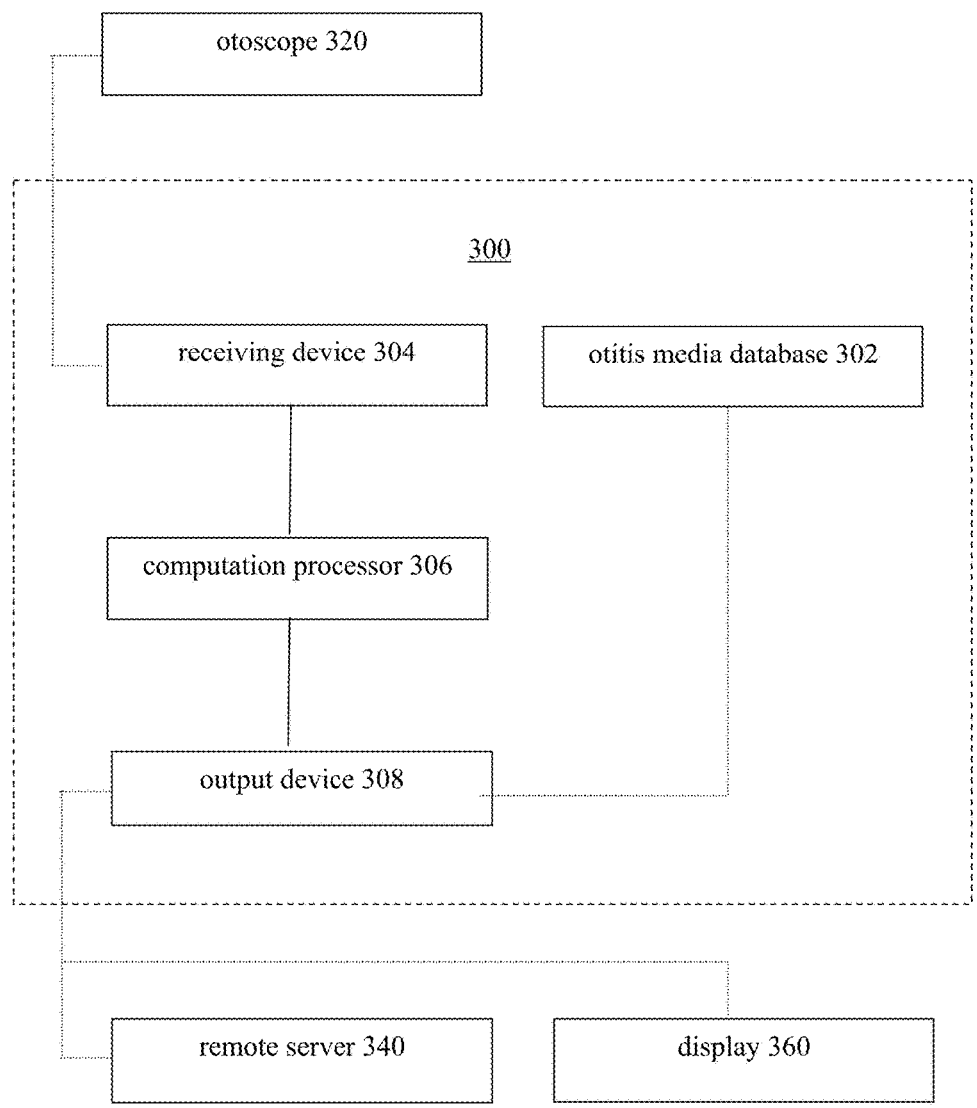
FIG. 3 is a block diagram of an image analysis system in accordance with various embodiments of the present disclosure.

FIG. 3 is a block diagram of an image analysis system in accordance with various embodiments of the present disclosure. The image analysis system 300 comprises an otitis media database 302, a receiving device 304, a computation processor 306 and an output device 308.

In an embodiment, the otitis media database 302, for example, an optical disc device, a hard drive or a remote server is communicatively via a network. The network, which may include, for example, the Internet, intranets, extranets, wide area networks (WANs), local area networks (LANs), wired networks, wireless networks, or other suitable networks, etc., or any combination of two or more such networks.

The computation processor 306 is connected with the receiving device 304 to classify the tympanic membrane image into a plurality of anatomic regions based on a plurality of tissue types. Then, each of anatomic regions is coded with a numerical number to describe its morbid condition.

In an embodiment, the receiving device 304 is coupled via a wired or wireless communication path to an otoscope 320 with an image capture device for retrieving a plurality of tympanic membrane images.

Then, the computation processor 306 chooses other one of anatomic regions orderly until all anatomic regions are coded with numerical number (v11, . . . , v1k), and obtains an eigenvalue (A1=[v11, . . . , v1k]) through collecting the numerical number of each anatomic region.

The output device 308 is connected with the computation processor 306 and the otitis media database 302, obtains a matrix A=[$v_{11}$, . . . , $v_{1k}$ $v_{21}$, . . . , $v_{2k}$, . . . , $v_{n1}$, . . . , $v_{nk}$] from the otitis media database 302, and then obtains a plurality of contrast values based on performing multiplication of the matrix and a weighting matrix (S=[$s_1, s_2, \ldots, s_j$]).

In an embodiment, the output device 308 is coupled via a wired or wireless communication path to the remote server 340 for recording data from the image analysis system or a display 360, wherein the display 360 may comprise a computer monitor, a plasma screen for a PC, a liquid crystal display (LCD), a touch screen display, or other display device for displaying a table or diagram as results of the image analysis system.

The output device 308 selects a lowest difference value from the difference between the numerical numbers and the contrast values and records a type of ear infection based on the tympanic membrane image corresponding to the lowest difference value of the contrast value.

In an embodiment, the tympanic membrane image has the lowest difference value based on the numerical number minus the contrast value ($A_1S$), then the output device 308 records the contrast value ($A_1S$) and the type of ear infection corresponding to the contrast value ($A_1S$) such as acute otitis media.

Figure 4:
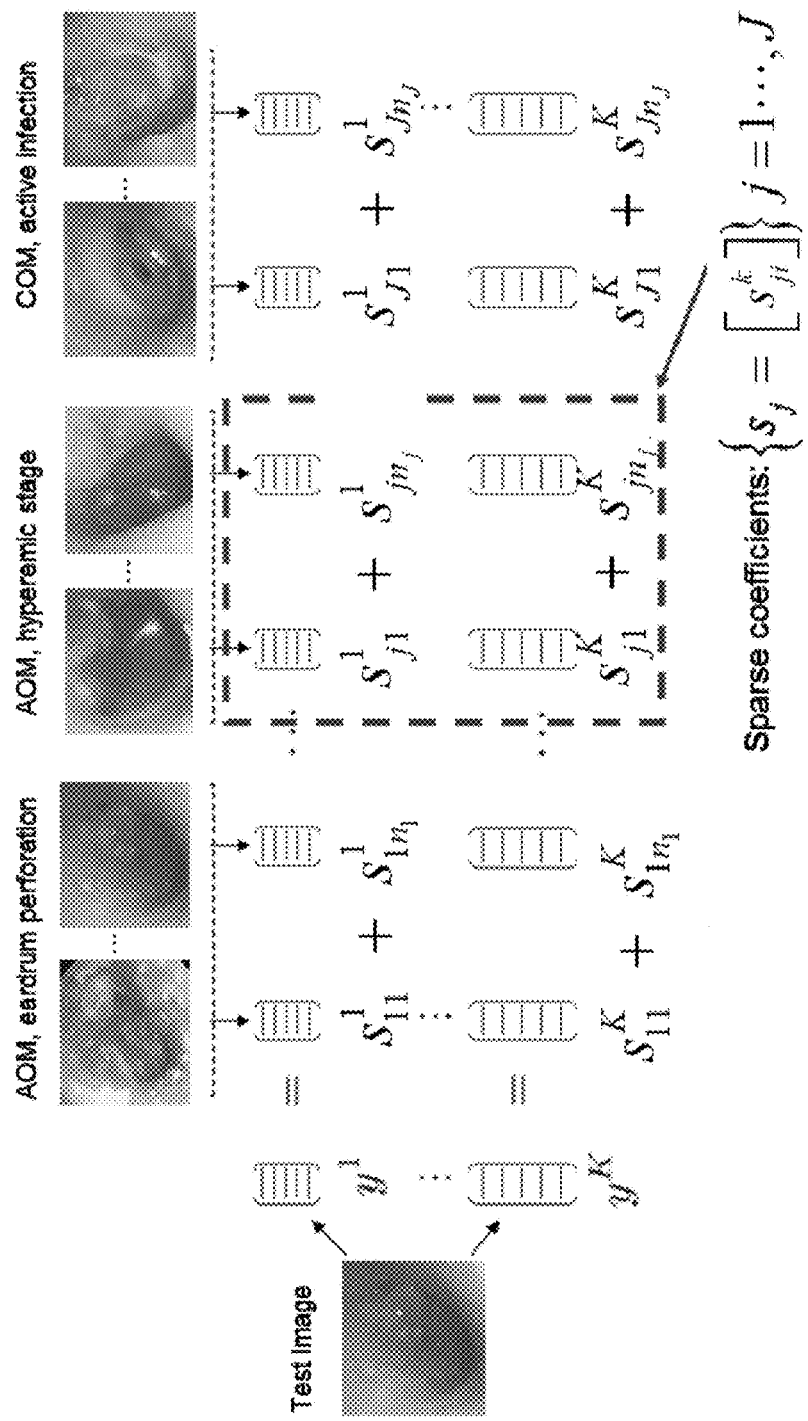
FIG. 4 illustrates calculation of the lowest difference value in accordance with various embodiments of the present disclosure.

Reference is made to FIG. 4, FIG. 4 illustrates calculation of the lowest difference value in accordance with various embodiments of the present disclosure. The output device 308 selects the lowest difference value from the difference between the numerical numbers and the contrast values. The linear combination of the corresponding training features is calculated according to the following expression:

$$y^k = \sum_{j=1}^{J} A_j^k s_j^k + \varepsilon^k$$

where k represents the types of ear infection, $y^k$ represents each feature of the tympanic membrane image, $A_j^k$ represents the matrix, $s_j^k$ represents the weighting matrix, and $\varepsilon^k$ represents a difference value based on performing multiplication of the matrix and the weighting matrix and then subtracted by the numerical number (residual term).

Figure 5:
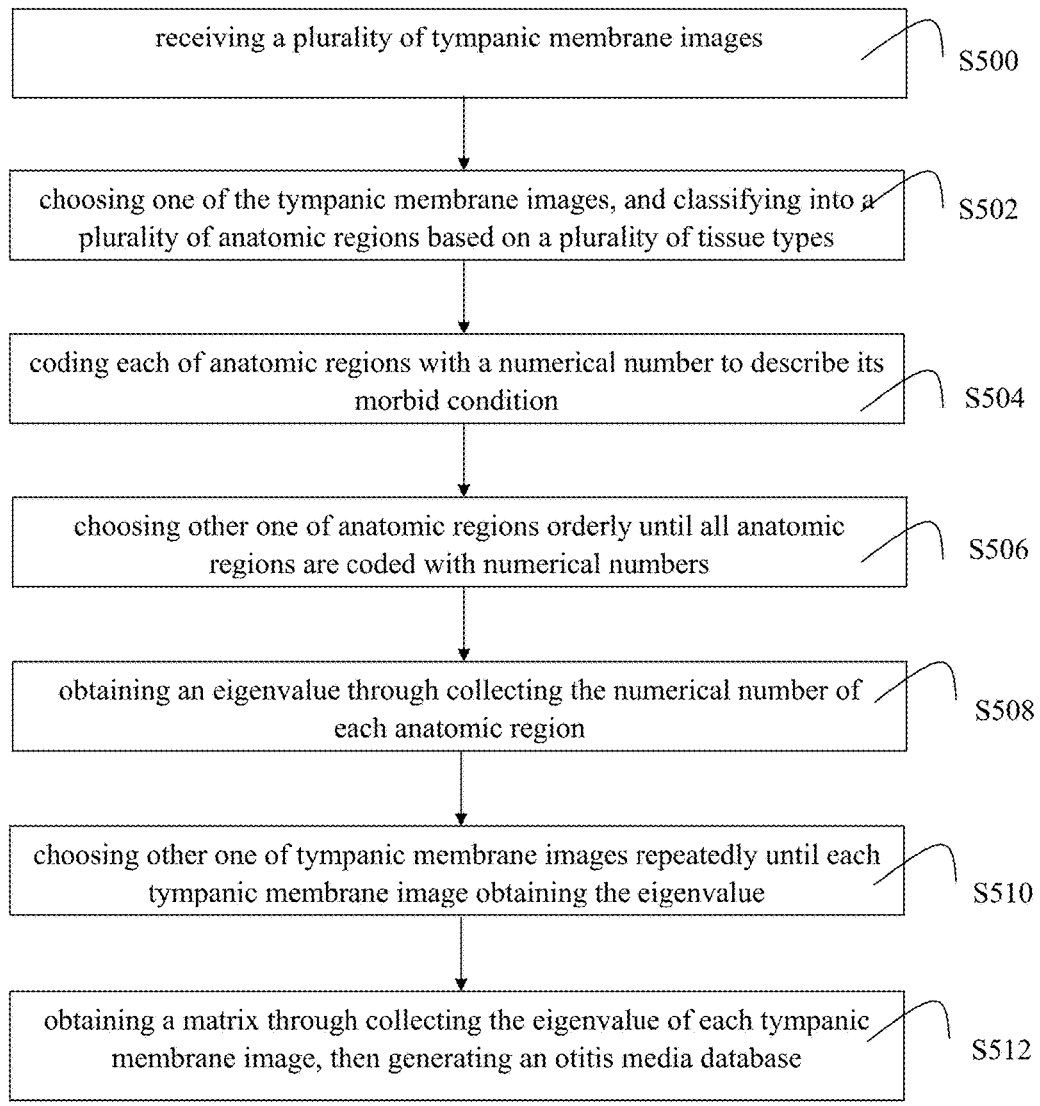
FIG. 5 is a flowchart in accordance with one embodiment for database constructing.

FIG. 5 is a flowchart in accordance with one embodiment for database constructing. It is understood that the flowchart of FIG. 5 provides merely an example of the many different types of functional arrangements that may be employed to implement the operation of the various components of the system for database constructing 100 (FIG. 1). As an alternative, the flowchart of FIG. 5 may be viewed as depicting an example of steps of a method implemented in the system for database constructing 100 according to one or more embodiments.

Beginning with step S500, the receiving device 102 (FIG. 1) retrieves a plurality of tympanic membrane images, wherein the tympanic membrane images are ear infection in different types. The ear infection may include, for example, an acute otitis media and an otitis media with effusion.

In step S502, the computation processor 104 (FIG. 1) is connected with the receiving device 102 to choose one of the tympanic membrane images, and then classifies the tympanic membrane image into a plurality of anatomic regions based on a plurality of tissue types.

In step S504, coding each of anatomic regions with a numerical number to describe its morbid condition. The morbid condition of the anatomic region comprises at least one of color feature, geometric feature, texture feature and shape feature. The color feature comprises at least one of hue, saturation and lightness. The geometric feature comprises a histogram of oriented gradient. The texture feature comprises a local binary pattern. The shape feature comprises a statistical chart of self-similarity geometric pattern.

Then, in step S506, the computation processor 104 chooses other one of anatomic regions orderly until all anatomic regions are coded with the numerical number.

In step S508, the computation processor 104 obtains an eigenvalue through collecting the numerical number of each anatomic region.

In step S510, the computation processor 104 chooses other one of tympanic membrane images repeatedly until each tympanic membrane image obtaining the eigenvalue.

Finally, in step S512, the access device 160 (FIG. 1) is connected with the computation processor 104 to obtain a matrix through collecting the eigenvalue of each tympanic membrane image, and then generating an otitis media database 140.

Figure 6:
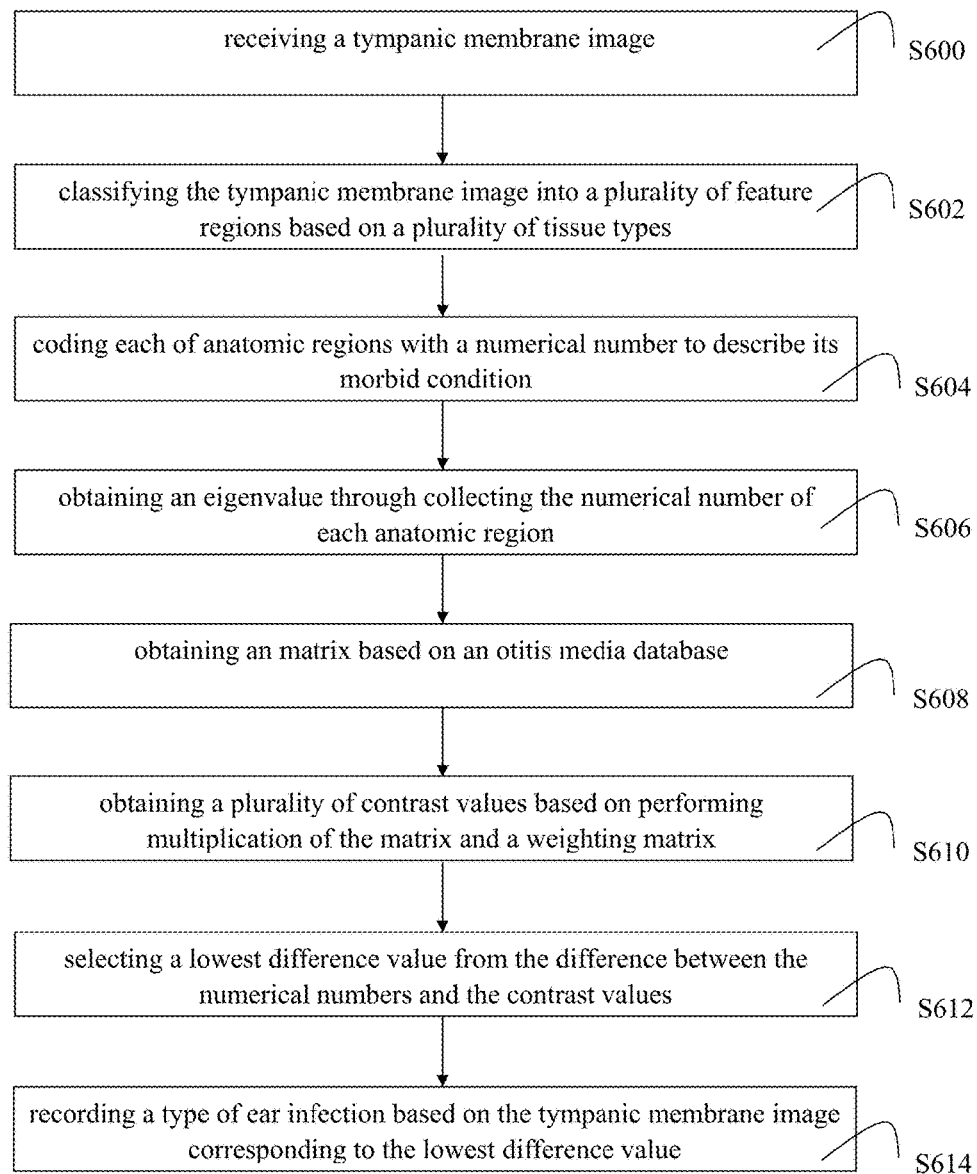
FIG. 6 is a flowchart in accordance with one embodiment for an image analysis.

Reference is made to FIG. 6, which is a flowchart in accordance with one embodiment for the image analysis system. It is understood that the flowchart of FIG. 6 provides merely an example of the many different types of functional arrangements that may be employed to implement the operation of the various components of the image analysis system 300 (FIG. 3). As an alternative, the flowchart of FIG. 6 may be viewed as depicting an example of steps of a method implemented in the image analysis system 300 according to one or more embodiments.

Beginning with step S600, the receiving device 304 (FIG. 3) retrieves a tympanic membrane image.

In step S602, the computation processor 306 (FIG. 3) is connected with the receiving device 304 to classify the tympanic membrane image into a plurality of anatomic regions based on a plurality of tissue types.

In step S604, coding each of anatomic regions with a numerical number to describe its morbid condition. The morbid condition of the anatomic region comprises at least one of color feature, geometric feature, texture feature and shape feature. The color feature comprises at least one of hue, saturation and lightness. The geometric feature comprises a histogram of oriented gradient. The texture feature comprises a local binary pattern. The shape feature comprises a statistical chart of self-similarity geometric pattern.

In step S606, the computation processor 306 further chooses other one of anatomic regions orderly until all anatomic regions are coded with numerical numbers, then obtains an eigenvalue through collecting the numerical number of each anatomic region.

Then, in step 608, the output device 308 (FIG. 1) is connected with the computation processor 306 and the otitis media database 302 for obtaining a matrix from the otitis media database 302, and then obtains a plurality of contrast values based on performing multiplication of the matrix and a weighting matrix.

Finally, in step S610, the output device 308 selects a lowest difference value from the difference between the numerical numbers and the contrast values and recording a type of ear infection based on the tympanic membrane image corresponding to the lowest difference value of the contrast value.

The invention provides a method and system for database constructing based on a plurality of tympanic membrane images of any otitis media. The method and system collects the numerical value of each tympanic membrane image to obtain a matrix, and then generates an otitis media database. The otitis media database comprises a plurality of eigenvalues, and each eigenvalue corresponding to a type of otitis media.

Furthermore, the medical person compares the tympanic membrane images with the otitis media database to diagnosis the tympanic membrane image corresponding to belong to any type of otitis media, not only to accelerate otitis media type of interpretation, but also to improve its accuracy.

What is claimed is:

1. A tympanic membrane image analysis method, comprising:
    receiving a tympanic membrane image obtained from an otoscope, and classifying the tympanic membrane image into a plurality of anatomic regions based on a plurality of tissue types;
    coding each of the anatomic regions with a numerical number to describe its morbid condition;
    obtaining an eigenvalue through collecting the numerical numbers from each anatomic region;
    obtaining a matrix with a plurality of reference eigenvalues from an otitis media database, then calculating a plurality of contrast values by performing multiplication of the matrix and the eigenvalue with a weighting matrix for the numerical numbers of each anatomic region; and
    determining a type of ear infection from the tympanic membrane image in accordance with the lowest contrast value, the lowest contrast value being a reference eigenvalue;
    wherein the otitis media database is constructed through steps comprising:
    receiving a plurality of reference tympanic membrane images, wherein the reference tympanic membrane images are ear infections in different types;
    choosing one of the reference tympanic membrane images, and classifying into the anatomic regions based on the tissue types;
    coding each of the anatomic regions with the numerical number to describe its morbid condition;
    obtaining the reference eigenvalue through collecting the numerical number of each anatomic region;
    choosing other one of the reference tympanic membrane images repeatedly until obtaining the reference eigenvalues from each tympanic membrane image; and
    determining the otitis media database of ear infection in accordance with the matrix through sequentially arranging the reference eigenvalues of each reference tympanic membrane image.

2. The method of claim 1, wherein the ear infection comprises an acute otitis media and an otitis media with effusion.

3. The method of claim 1, wherein the morbid condition of the anatomic region comprises at least one of: color feature, geometric feature, texture feature and shape feature.

4. The method of claim 3, wherein the color feature comprises at least one of: hue, saturation and lightness.

5. The method of claim 3, wherein the geometric feature comprises a histogram of oriented gradient (HOG).

6. The method of claim 3, wherein the texture feature comprises a local binary pattern (LBP).

7. The method of claim 3, wherein the shape feature comprises a statistical chart of self-similarity geometric pattern.

8. A tympanic membrane image analysis system, comprises:
    an access device with an otitis media database, saving a matrix;
    an otoscope, receiving a tympanic membrane image;
    a computation processor connected with the otoscope, classifying the tympanic membrane image into a plurality of anatomic regions based on a plurality of tissue types, then coding each of anatomic regions with a numerical number to describe its morbid condition, and obtaining an eigenvalue through collecting the numerical numbers from each anatomic region; and an output device connected with the computation processor and the access device, obtaining a matrix from the otitis media database, then calculating a plurality of contrast values by performing multiplication of the matrix and the eigenvalue with a weighting matrix for the numerical numbers of each anatomic region, determining a type of ear infection from the tympanic membrane image in accordance with the lowest contrast value, the lowest contrast value being a reference eigenvalue;

wherein the otitis media database is constructed through steps comprising:

receiving a plurality of reference tympanic membrane images, wherein the reference tympanic membrane images are ear infections in different types;

choosing one of the reference tympanic membrane images, and classifying into the anatomic regions based on the tissue types;

coding each of the anatomic regions with the numerical number to describe its morbid condition;

obtaining the reference eigenvalue through collecting the numerical number of each anatomic region;

choosing other one of the reference tympanic membrane images repeatedly until obtaining the reference eigenvalues from each tympanic membrane image; and determining the otitis media database of ear infection in accordance with the matrix through sequentially arranging the reference eigenvalues of each reference tympanic membrane image.

9. The device according to claim 8, wherein the ear infection comprises an acute otitis media and an otitis media with effusion.

10. The device according to claim 8, wherein the morbid condition of the anatomic region comprises at least one of: color feature, geometric feature, texture feature and shape feature.

* * * * *